United States Patent

Montano et al.

[11] Patent Number: 5,099,755
[45] Date of Patent: Mar. 31, 1992

[54] APPARATUS FOR SUB-DIVIDING HAY BALES

[75] Inventors: Donald Montano; Ernest Montano, both of Merced, Calif.

[73] Assignee: Montano Manufacturing, Inc., Merced, Calif.

[21] Appl. No.: 663,721

[22] Filed: Mar. 1, 1991

Related U.S. Application Data

[60] Continuation-in-part of Ser. No. 462,639, Jan. 9, 1990, Pat. No. 5,017,399, which is a division of Ser. No. 217,622, Jul. 11, 1988, Pat. No. 4,909,139.

[51] Int. Cl.⁵ ................................. A23K 1/00
[52] U.S. Cl. ............................. 99/537; 83/404; 83/404.2; 83/425.3
[58] Field of Search ............. 99/485, 486, 516, 532, 99/537, 538, 567; 83/404, 404.2, 425.3, 928, 929; 426/636, 518, 807

[56] References Cited

U.S. PATENT DOCUMENTS

| | | | |
|---|---|---|---|
| 474,233 | 5/1892 | Edwards | 83/425.3 |
| 477,956 | 6/1892 | Peterson | 83/425.3 |
| 1,298,520 | 3/1919 | Lawrence | 83/425.3 |
| 2,161,891 | 6/1939 | Spang | 83/404.2 |
| 3,261,383 | 7/1966 | Coblentz | 83/404.2 |
| 3,347,289 | 10/1967 | Kotesovec et al. | 83/404 |
| 3,841,186 | 10/1974 | Demerin | 83/404.2 |
| 4,185,549 | 1/1980 | Roepnack | 99/533 |
| 4,376,515 | 3/1983 | Soe | 366/177 |
| 4,453,460 | 6/1984 | Rabe et al. | 99/533 |
| 4,627,338 | 12/1986 | Sprott et al. | 99/516 |

FOREIGN PATENT DOCUMENTS 296643 4/1971 U.S.S.R. ................ 83/404.2

Primary Examiner—Timothy F. Simone
Attorney, Agent, or Firm—Owen, Wickersham & Erickson

[57] ABSTRACT

A machine for cutting generally oblong, compressed bales of dried hay or forage for livestock, comprises an inlet chute for receiving compressed bales in end-to-end alignment and moving them forwardly into a sawing section. The latter has side walls, a floor for supporting a bale as it moves through the sawing section and a horizontal top member parallel with and spaced above the floor. A plurality of circular saws are spaced apart on a pair of upper and lower shafts, each saw on one said shaft being vertically aligned with a saw on the other shaft. The saw shafts are connected by a pulley and driven by a rotary power source. A hydraulic pump connected to one of the saw shafts is utilized to drive hydraulic motors for moving bales through the sawing section.

5 Claims, 8 Drawing Sheets

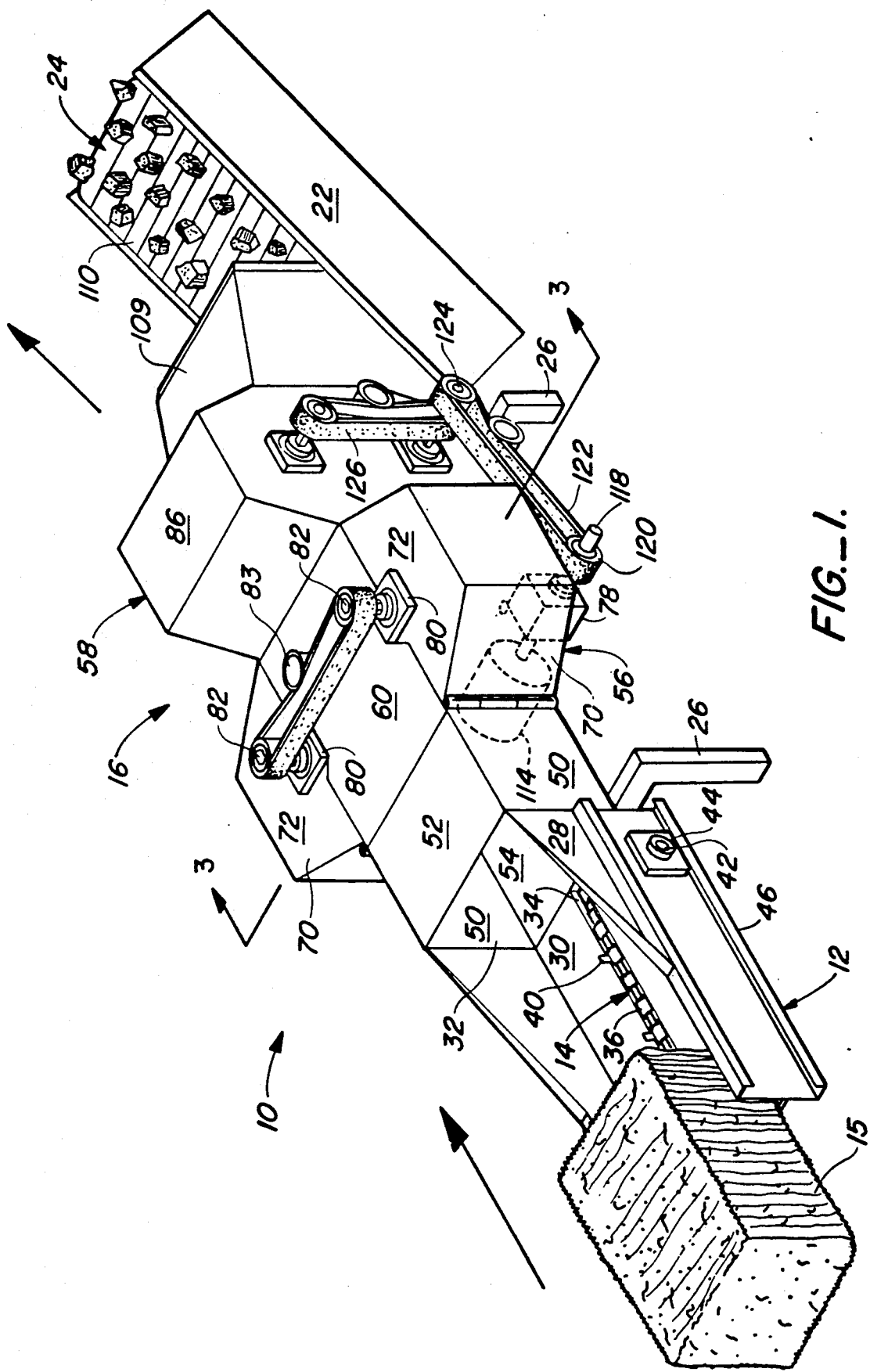
FIG._1.

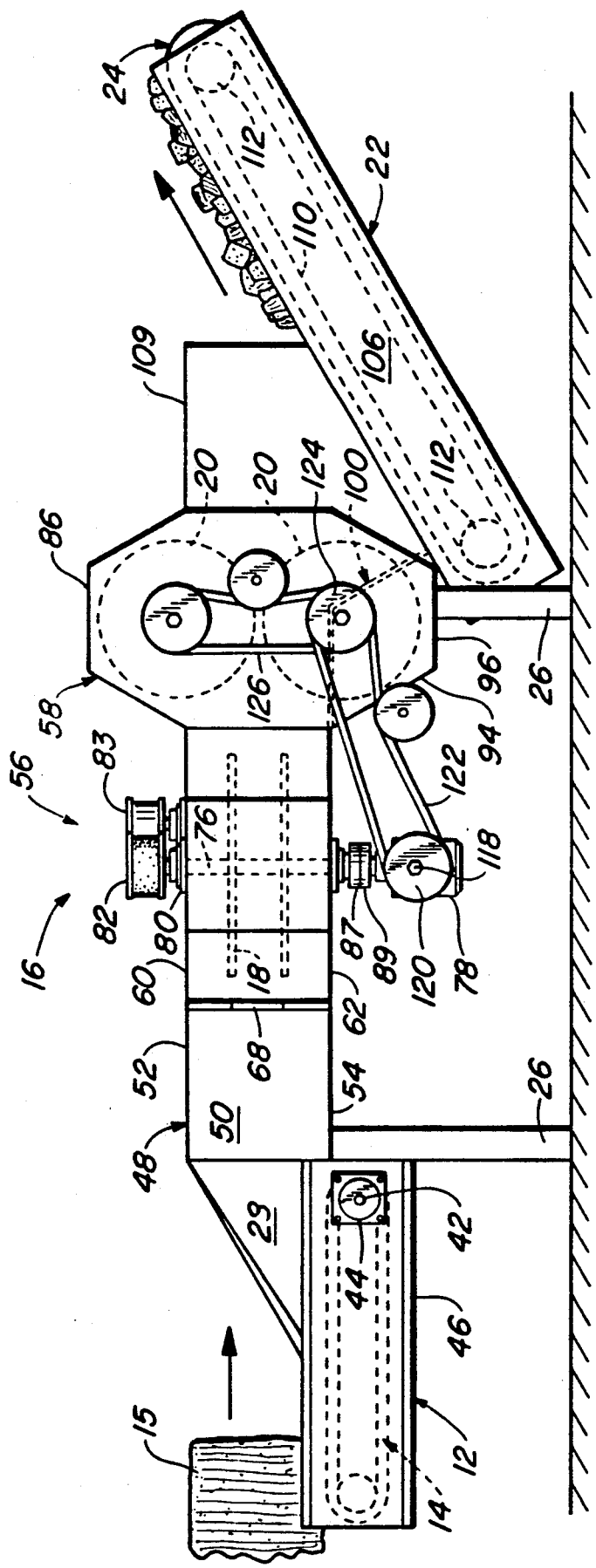
FIG._2.

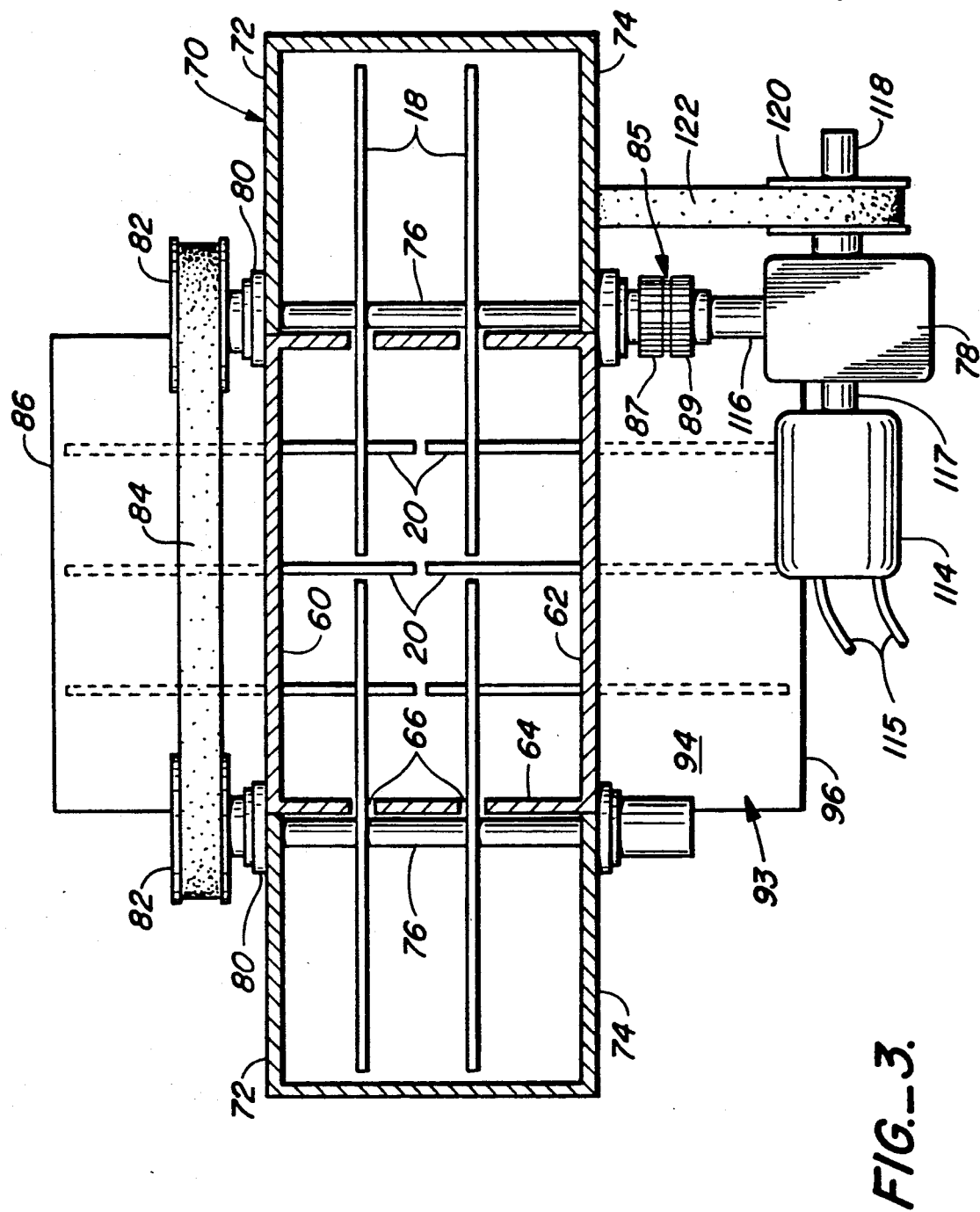
FIG._3.

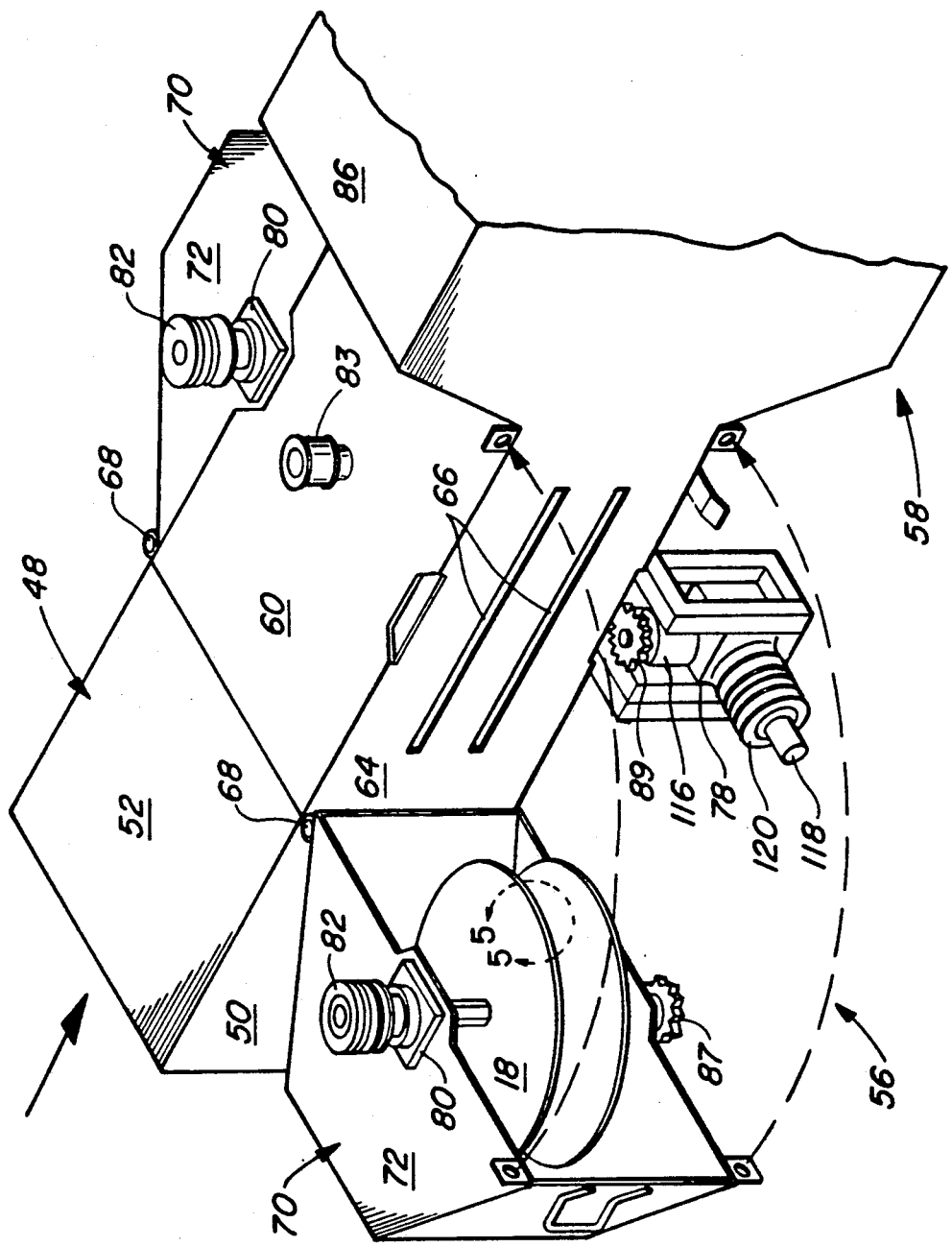
FIG._4.

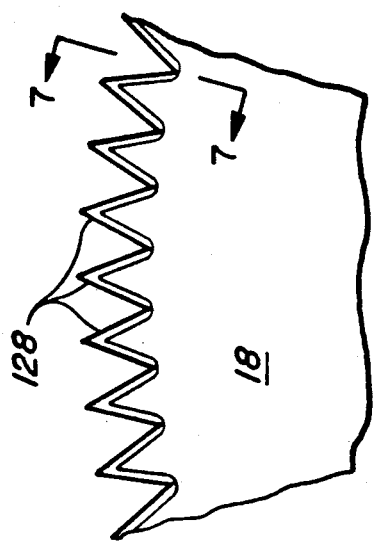
FIG._6.
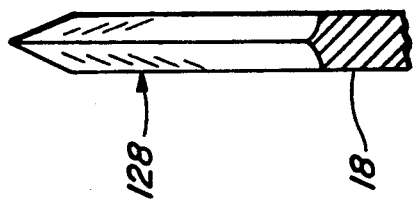
FIG._7.
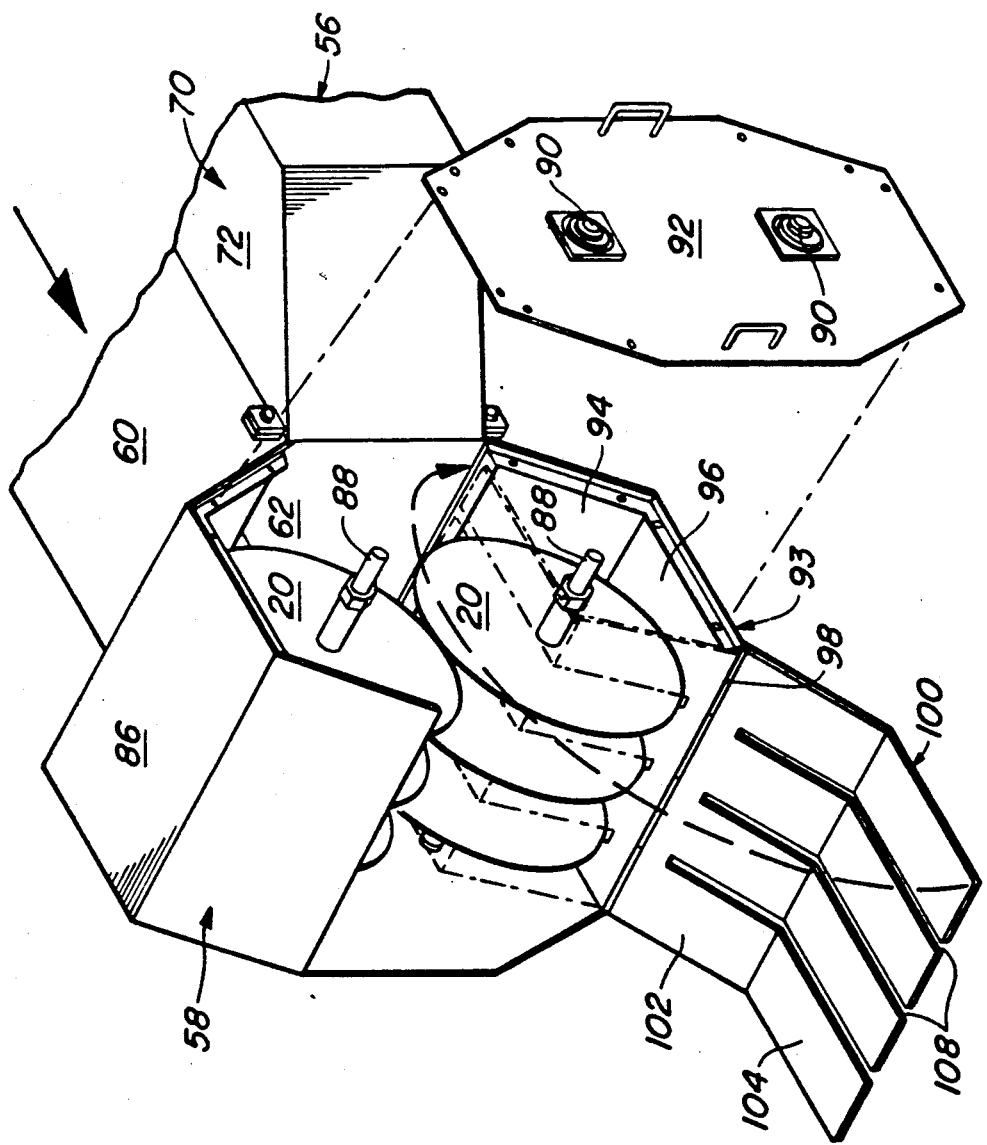
FIG._5.

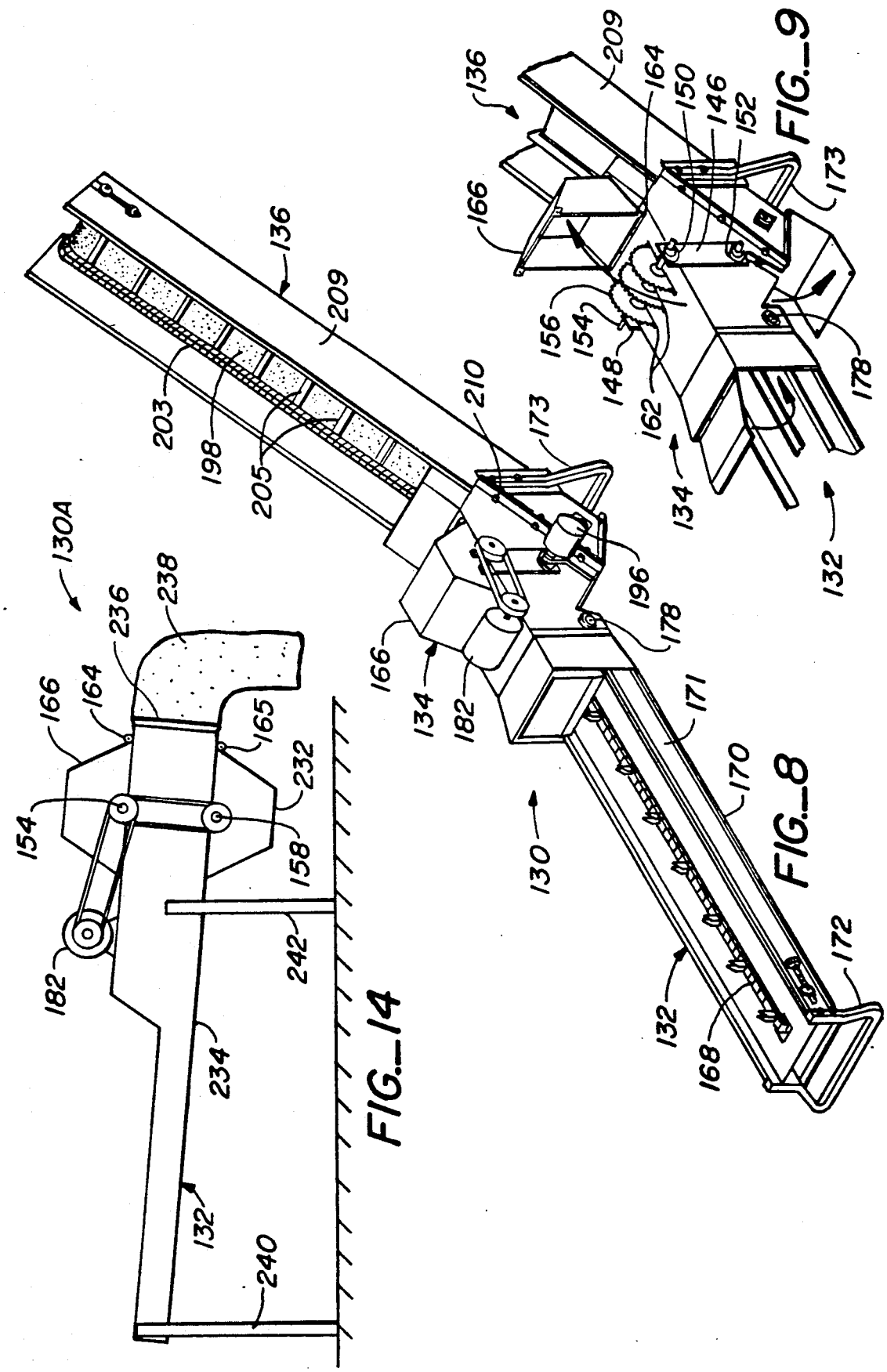

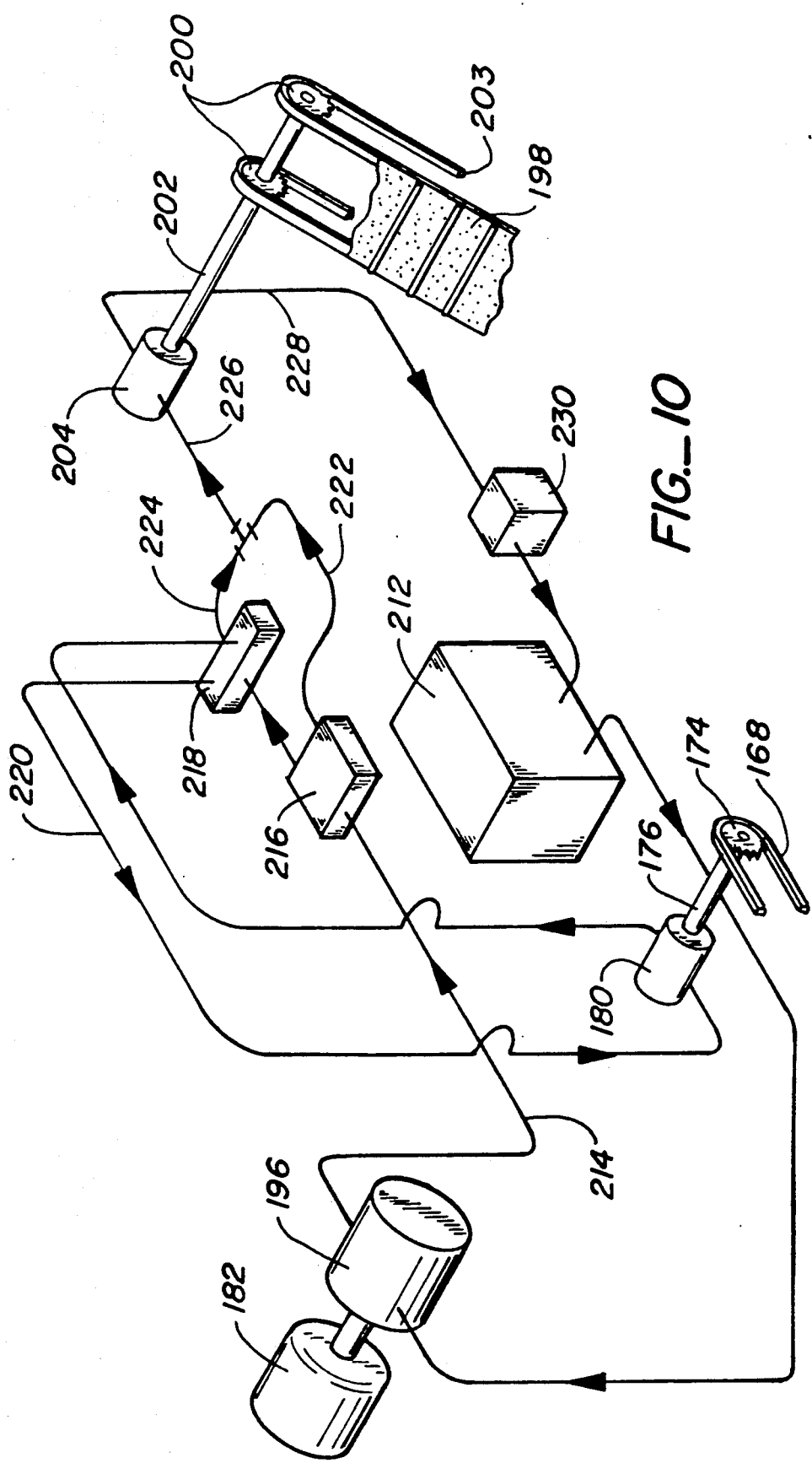
FIG._10

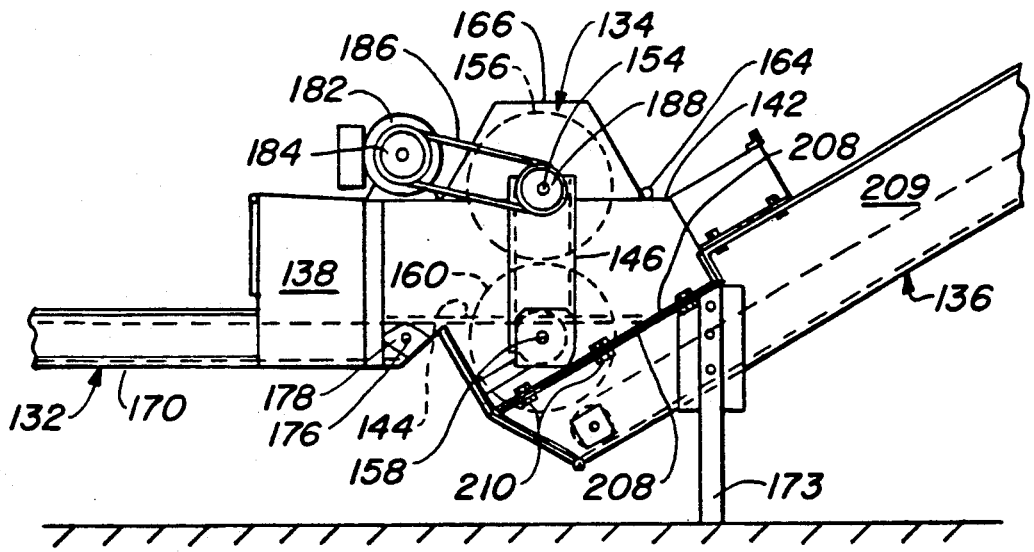
FIG._11
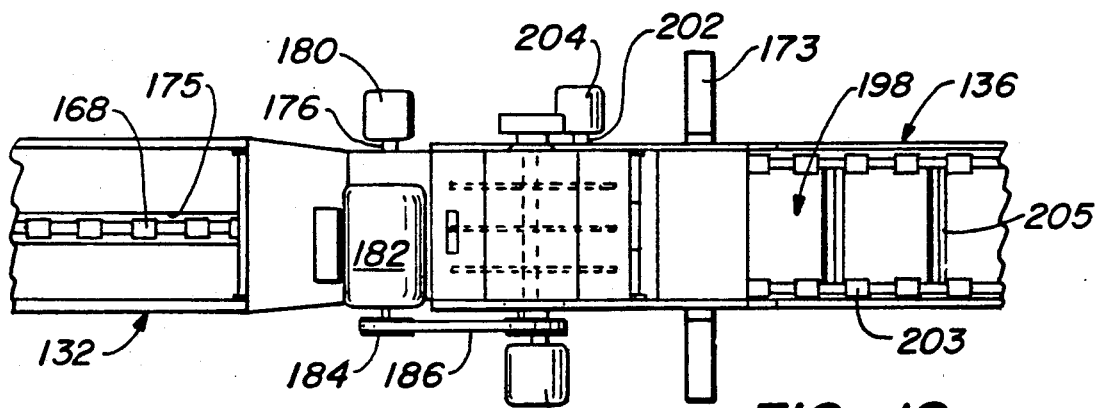
FIG._12
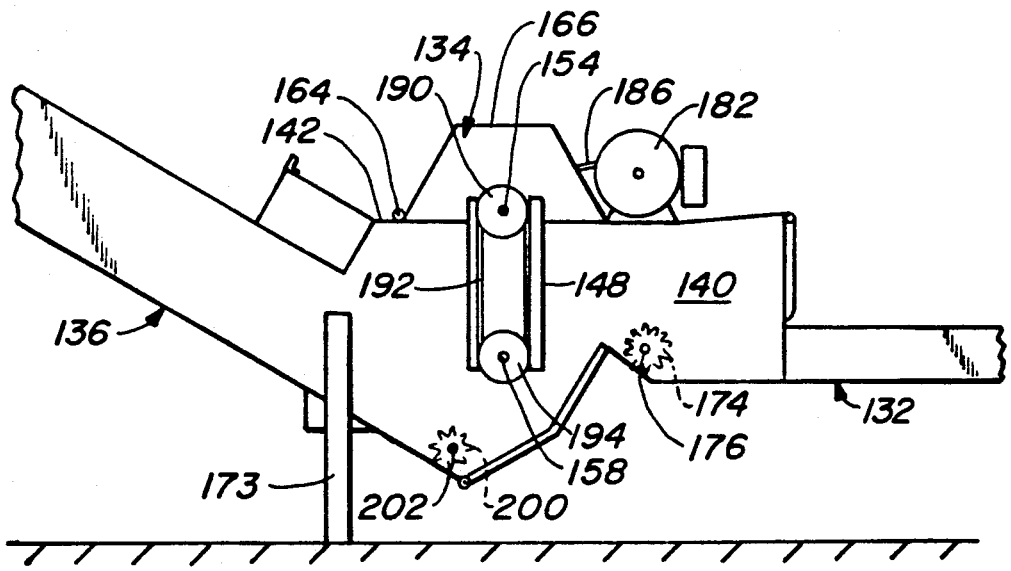
FIG._13

APPARATUS FOR SUB-DIVIDING HAY BALES

This application is a continuation-in-part of U.S. application Ser. No. 07/462,639, filed Jan. 9, 1990, now U.S. Pat. No. 5,017,399 which is a divisional application of U.S. application Ser. No. 07/217,622, filed July 11, 1988, now U.S. Pat. No. 4,909,139.

This invention relates to apparatus for preparing livestock feed and more particularly to a machine for sub-dividing bales of forage such as hay into smaller portions for livestock consumption.

BACKGROUND OF THE INVENTION

Livestock such as cattle are fed throughout the year at different locations with a variety of feed of various forms including fodder and forage such as staple grains and hay. In some instances certain feed constituents with supplements are chopped to a relatively small size, mixed and then compressed in pellet form that is more efficiently stored and distributed. Hay or alfalfa, which is a staple livestock forage feed, is usually collected and compressed into dense, tightly packed bales that are generally oblong in shape. In order for the compressed baled hay to be distributed to individual cattle small quantities of hay must be separated from the bale. Where many animals are involved it is overly time consuming to separate by hand a bale of hay. Heretofore, to solve the problem of breaking up hay bales into smaller portions machines have been devised for shredding or grinding the hay bales. However, a serious disadvantage with such prior machines was that they tended to pulverize the hay, destroying the leaf content and destroying a large percentage of the hay.

It is therefore a general object of the invention to provide a machine for sub-dividing bales of compressed hay or forage into a plurality of substantially smaller portions that can be readily distributed and devoured by livestock.

Another more specific object of the invention is to provide a machine which will saw a bale of hay at a plurality of parallel spaced apart locations to form a plurality of substantially equal elongated slab sections which will readily break apart into smaller components without destroying the fibre and leaf content of the hay.

Still another object of the invention is to provide a machine that will move a continuous line of spaced apart hay bales through successive banks of moving multiple saws to form a multiplicity of oblong hay components of substantially uniform size.

Another object of the invention is to provide an improved machine for sub-dividing a compressed bale of hay into smaller, uniform portions that can be shipped or stored in knockdown form and then can be readily erected with minimal tools and labor to be ready for its hay cutting operation.

Still another object of the invention is to provide a machine for cutting a bale of hay into a plurality of slab sections wherein vertical cutting saws and also drive means for input and output conveyors are powered by the same power source.

Yet another object of the invention is to provide a machine for cutting hay bales into sub sections that is particularly well adapted for ease and economy of manufacture and that is easy to service and maintain.

SUMMARY OF THE INVENTION

In accordance with the principles of the invention a hay apportioning machine is provided which comprises generally a input chute that is slightly wider than a standard bale of compressed hay. A continuously moving chain belt with spaced apart lugs is provided in the bottom side of the input chute. Ahead of the chain belt within the chute is a bale sawing section which supports first and second gangs of rotary saws that are aligned so as to cut the hay bale vertically into a series of slab sections. From the two aligned gangs of vertically oriented rotary saws, the cut slabs of the bale are forced onto an outlet conveying belt in the bottom of a sloped outlet chute. As the sub-divided slabs fall upon the movable exit conveying belt within the outlet chute, they tend to break or flake apart into smaller portions that are more easily distributed to and eaten by livestock. In accordance with the invention, the two gangs of rotary saws are driven by a power source which also drives a hydraulic pump. The latter in turn drives hydraulic motors for driving the inlet chain belt and the outlet conveying belt. In operation, the machine will handle a continuous line of hay bales to convert the tightly packed bales to flakes of loose hay which can be readily eaten by livestock.

Other objects, advantages and features of the invention will become apparent from a detailed description of one embodiment thereof, presented in conjunction with the accompanying drawing.

BRIEF DESCRIPTION OF THE DRAWING

FIG. 1 is a view in perspective of a hay bale cutting machine embodying principles of the present invention.

FIG. 2 is a view in elevation and partially in section of the machine shown in FIG. 1.

FIG. 3 is an end view in section of the machine of FIG. 1, taken along line 3—3 thereof.

FIG. 4 is a fragmentary view in perspective showing a portion of the sawing section including the horizontal rotary saw blades for the machine of FIG. 1.

FIG. 5 is a fragmentary, exploded view in perspective showing a portion of the sawing section with the vertical rotary saw blades for the machine of FIG. 1.

FIG. 6 is a fragmentary view of one saw blade taken at line 6—6 of FIG. 4.

FIG. 7 is a fragmentary view in section taken at line 7—7 of FIG. 6.

FIG. 8 is a view in perspective of a modified hay bale cutting machine according to the present invention.

FIG. 9 is a fragmentary view in perspective of the machine in FIG. 8, showing upper and lower saw covers in their open position.

FIG. 10 is a diagram of the power drive system for the saws and conveyors of the machine of FIG. 8.

FIG. 11 is a fragmentary view in elevation of the machine shown in FIG. 8.

FIG. 12 is a fragmentary top view of the machine in FIG. 8.

FIG. 13 is a fragmentary view in elevation taken along the line 13—13 of FIG. 12 showing the opposite side of the machine from that shown in FIG. 11.

FIG. 14 is a view in elevation of a modified machine according to the invention.

DETAILED DESCRIPTION OF EMBODIMENT

With reference to the drawing, FIGS. 1 and 2 show an apparatus 10 for sub-dividing compressed bales of hay or the like in accordance with the principles of the present invention. In broad terms, the apparatus comprises an input chute 12 with drive means 14 for moving hay bales 15 forwardly in a linear path. This input chute is connected to a sawing chamber 16 which includes a first assembly of circular saws 18 positioned for cutting horizontally and mounted in line with the linear path of the incoming bales. Spaced therefrom is a second assembly of circular saws 20 which are positioned to cut the moving bales at spaced apart vertical intervals as they move further along the linear path. As a cut bale emerges from the second saw series, its sub-divided elongated oblong portions fall by gravity onto a connected outlet chute 22 having a bottom conveyor means 24 that moves the smaller hay portions to its outlet end.

The present invention is particularly adaptable for cutting or sub-dividing bales of hay or forage that are generally oblong in shape and are formed by progressively compressing quantities of loose hay in successive layers using end to end pressure in the baler. Such a method normally provides the bale with a natural transverse grain with each quantity of loose hay forming a layer or flake of compressed hay in the bale. When the bale is used, these flakes can be more readily separated along their transverse grain and this bale characteristic may be utilized in the present invention. That is, the bales are preferably first cut horizontally along planes perpendicular to the transverse flake planes, and then vertically but also perpendicular to the transverse flake planes. These two cutting steps thus sub-divide the bale into a series of oblong blocks or sub-portions and within each one of them the flake layers are transverse to the longitudinal dimension of the subdivided block. This enables sub-portions of each block to break apart even further into smaller portions by minimal force such as by falling on the outlet conveyor. The end product is thus a relatively small portion of the hay bale which has been sub-divided therefrom without damaging leaf and fibre content so as to make it readily consumable and highly nutritional for livestock. Typical oblong hay bales have dimensions of approximately 23 inches wide, 16 inches high and 42 inches long. When subdivided in accordance with the illustrated embodiment of the present invention, the elongated cut blocks of hay bales may have a cross-sectional dimension of approximately $5\frac{1}{8}$ inches by $5\frac{3}{4}$ inches with the same length, and then these sub-divided blocks will readily break apart along flake layers to form even smaller portions that are more easily managed by feeding livestock. The aforesaid dimensions are not meant to be limiting and are presented by way of example. Other sized bales could be cut into smaller or longer blocks depending on the number of saw blades used, in accordance with the invention.

Describing now the apparatus 10 in greater detail, as shown in FIGS. 1-5, it is seen that the sawing chamber 16 is mounted above ground level on a pair of supports 26. The input chute 12 has a pair of spaced apart side walls 28 connected to a bottom floor portion 30 that extends to and connects with an opening 32 into the sawing chamber 16. A slot 34 is provided in the floor portion 30 and extends axially along its center line to accommodate the drive means 14 for moving bales through the input chute 12 and into the sawing chamber. The drive means 14 comprises an endless chain 36 supported at opposite ends on a pair of sprockets (not shown), and it extends substantially the full length of the input chute. At spaced intervals along the drive chain are upwardly projecting lugs or pegs 40 which are adapted to penetrate into a hay bale 15 and provide a means for temporarily retaining it on the chain as it is drawn over the floor 30 of the input chute. On one end of the drive chain, one sprocket is mounted on a shaft 42 that is journaled in a bearing member 44 mounted on a frame section 46 underneath the floor of the input chute. The shaft 42 is connected to a suitable constant speed drive motor (not shown) which may be hydraulic or electric.

The sawing chamber 16, as shown in FIGS. 1 to 5, provides a continuous guide through passageway for the incoming hay bales which enables them to move progressively through the first and second series of saws 18 and 20 along a straight path with precision. A short inlet section 48 of the sawing chamber is formed by parallel sidewalls 50 connected to top and bottom panels 52 and 54, all preferably made of sheet metal and forming a rectangular cross sectional area large enough to accommodate a standard sized hay bale with ample clearance to facilitate easy movement through the inlet section.

Attached to the inlet section is the sawing chamber 16, comprised of a first section 56 for the first saw assembly 18 which is connected to a second section 58 for the second gang saw assembly 20. As shown in FIGS. 3 and 4, the first sawing section comprises an upper cover member 60 which is a continuation of the top panel 52 for the inlet section 42, a bottom member 62 which is similarly a continuation of the inlet bottom panel member 54 and side wall members 64 that have a series of spaced apart slots 66. Connected by vertical hinge members 68 to the inlet section sidewalls 64 are a pair of semi-hexagonal shaped side housings 70, preferably made of sheet metal. Supported by top and bottom plates 72 and 74 of each side housing is a vertical shaft 76 on which is mounted a plurality of spaced apart circular saw blades 18 comprising the first saw assembly 18. Preferably, each saw blade has a flat sided hole to match a flat sided cross section of the shaft 76 to provide a non-slip connection, and spacers are used between the saw blades on the shaft to position the saw blades properly.

The ends of each shaft 76 are supported within bearings 80 that are attached to the top and bottom members 72 and 74 of each housing 70. The upper ends of the two shafts 76 are provided with pulleys 82 which support a continuous belt 84. An adjustable idler 83 is attached to the top panel 72 and engages the belt 84 to maintain its tight contact with the pulleys. The lower end of one shaft 76 is connected to a right angle gearbox 78 which is part of a main drive system for both horizontal and vertical gang saw assemblies 18 and 20. As shown in FIG. 2, this connection is preferably by means of a continuous chain 85 which fits around a sprocket 87 at the lower end of the shaft and a similar sprocket 89 on a shaft from the gear box 78.

When the machine 10 is in use with the side housings 70 in their closed position, the circular saw blades 18 on both of the shafts 80 extend through the slots 66. Also, they are sized in diameter so that their teeth are only a short distance apart (i.e. 0.5 inches) at the center line of the sawing chamber. Thus, as a hay bale is moved through the inlet section 12 into the horizontal saws 18, the bale is rapidly cut into horizontal slabs of compressed hay of equal thickness. The semi-hexagonal housings 70 remain closed when the apparatus is in use, but when servicing is required such as when saw blades are replaced, each housing 70 with its shaft 76 and supported saws can be pivoted outwardly around the hinge member 68, as shown in FIG. 4, (after removal of the belt 84) to provide access thereto.

The second section 58 of the sawing chamber 16 for the vertically oriented saw assembly 20 is connected directly to the first section 56 and includes a pair of semi-hexagonal housing members 86 that are similar in shape to those on the first or horizontal section.

As shown in FIG. 5, a pair of horizontal shafts 88 are spaced apart just above and below the passageway for hay bales through the sawing chamber, and the ends of these shafts are supported in bearings 90 fixed to a pair of sidewall panels 92 for the second sawing section. Each shaft 88 has a plurality of spaced apart circular saw blades 18 attached to it in the same manner as on the shaft 76 and, like the horizontal saw blades, they are sized so that only a small gap occurs between upper and lower saw blades.

A lower housing 93 of the second sawing section 58 which extends around the lower series of saw blades, has a panel 94 which slopes downwardly at an angle and is connected to a fixed lower horizontal panel 96. At the outer edge of the horizontal panel is a hinge 98 which connects the lower horizontal panel with a moveable internal support member 100 that is normally positioned to support a moving bale as it moves through the lower vertical saws when the machine is in operation.

This latter support member 100 comprises a first panel 102 which is parallel to the fixed panel 94 when in its operative bale-supporting position. This first panel 102 is integral with a second panel 104 which is parallel with the bottom fixed panel 96 and provides an extension of the bale supporting bottom panel 62 of the first or horizontal sawing section 56 when the support member 100 is in its operating position. A series of slots 108 are provided within the panels 102 and 104 which allow the lower vertical saw blades 20 to extend through when the support member 100 is in its operating position.

The sloping first panel 102 of the support member 100 for the vertical sawing section enables the elongated cut portions of the hay bale 15 to fall by gravity onto the outlet chute 22. This outlet chute, as shown in FIGS. 1 and 2, has parallel sidewalls 106, a cover panel 109 and the upwardly sloping endless conveyor belt or chain means 24 that removes the cut hay portions to the exit end of the outlet chute. The conveyor belt may comprise a series of transverse slats supported by a pair of endless chains that extend around a pair of sprockets 112 at each and. A drive sprocket at one end of the drive chain is attached to a shaft which is connected to a suitable drive motor (not shown) in a manner similar to the arrangement for the bale moving chain 36 within the inlet chute 12.

The drive system for both the horizontal and vertical gang saws is best shown in FIG. 1. A single rotary power source, such as an electrical motor or a tractor power takeoff is used to drive both sets of saws 18 and 20 at a constant speed. This power source (not shown) turns an input shaft 118 which is connected to the right angle gear box 78. The latter has one output shaft 116 which is connected to one vertical shaft 76 for driving the two sets of horizontal saws 18, since the two vertical shafts 76 are connected by the belt 84 as previously described. Another output shaft 117 from the gear box 78 is connected to a hydraulic pump 114, which supplies hydraulic pressure through outlets 115 connected to separate hydraulic motors (not shown) that drive the input drive chain 36 and the outlet conveyor means 24, respectively. A pulley 120 on the shaft 118 is connected by a belt 122 to a pulley 124 on a lower horizontal shaft 88 for the vertical sawing section. The latter shaft is connected by another belt 126 to the upper shaft 88 for the vertical sawing section 58. Thus, both groups of saws 18 and 20 for both the horizontal and vertical sawing sections are driven from a single power source at the same constant speed.

The circular saw blades 18 and 20 used in the hay cutting apparatus 10, as shown in FIG. 6, may be identical in size and shape and preferably are provided with generally triangular and symmetrically shaped teeth 128 as shown in FIG. 7. It has been found that such a saw configuration will readily cut through hay bales cleanly with precision and consistency without stalling to produce the sub-divided compressed hay components.

Generally, hay bales are formed by compressing stacked layers of loose hay. Thus, there is a natural tendency for such layers to separate in one transverse cross-section of the bales. Accordingly, it is preferable when sawing hay bales in the machine 10, that they be inserted into the inlet chute with the natural stacking layers vertically oriented and transverse to the planes on the two series of cutting saws. When the bale, so oriented is cut by the multiple saws 18 and 20 to form elongated sub-sections, these sub-sections will readily break apart into smaller feed portions as they fall onto the exit conveyor belt. Moreover, these sub-sections are formed without destroying the leaf or fibre content of the hay.

For some types of hay or forage, bales are formed by packing successive flakes with most of the main hay stems oriented horizontally. Thus, with such bales it is sufficient if they are cut only vertically in order to form smaller portions for livestock feed. An efficient machine 130 for accomplishing such vertical-only bale cutting is shown in FIGS. 8 to 14.

Generally, in the embodiment shown in FIG. 8, the machine 130 comprises an inlet conveyor 132 to be cut, a saw section 134 and an outlet conveyer 136 for cut portions of the hay. In a modified machine 130A, with a somewhat different saw section, as shown in FIG. 14, the outlet conveyer is eliminated, since in some instances a user may wish to use a portable conveyor or feed handling equipment, or none at all.

As shown in FIGS. 8-13, the bale cutting machine 130 comprises a saw section having vertical sidewalls 138 and 140 of sheet metal which are connected to vertically spaced apart upper and lower horizontal members 142 and 144 which together form a passageway for moving bales through the saw section having a rectangular cross-section. Fixed to the outer surface of the side walls, as by welding, are a pair of elongated and vertically oriented bearing support plates 146 and 148. Vertically spaced apart on each support plate are a pair of upper and lower bearing housings 150 and 152. The upper bearing housing support an upper shaft 154 for a series of spaced apart upper saws 156, (preferably three the embodiment shown) and the lower bearing housings 152 support a lower shaft 158 for a similar series of spaced apart lower saws 160 which are vertically aligned with the upper saws. The upper and lower saws are sized and their shafts are located so that the outer extremities of the saws are spaced apart by less than one inch at their nearest point. The upper shaft is located above the upper horizontal member and the lower shaft is located just under the lower horizontal member and slots 162 are provided in both upper and lower horizontal members to accommodate the rotating saw blades. The saw blades may be of the circular type as previously described and in some instances saw blades utilizing carbide type teeth may be used for longer wear and cutting efficiency.

Fixed by a transverse hinge member 164 to the upper horizontal member 142 is a protective hood 166 having a trapezoidal shape which can be secured to the horizontal member to cover the saw blades during operation of the device. The hood can be rotated on its hinge member to provide access to the upper saw blades when necessary.

The lower horizontal member 144 provides a level support for each bale as it is moved through the vertical saws 158 and 160 when the machine is in operation. This horizontal member is at the same level as an endless conveying chain 168 in the inlet chute 132 for the machine 130. The inlet chute 132 may be similar to the one described earlier for the machine 10 and includes a bottom floor portion 170 with side walls 171 that are spaced apart far enough to accommodate the width of a standard hay bale with ample clearance. Near the input end of the input chute, a pair of legs 172 are attached to the side rails to support it above ground level. The floor portion of the chute extends to the inlet opening of the saw section and is at the same level as its bottom horizontal member 144. A slot 175 is provided in the floor portion of the chute to support the chain 168 with bale moving lugs, as previously described and shown in FIG. 1. The chain extends around one sprocket (not shown) near the inlet end of the chute 132 and another sprocket 174 attached to a shaft 176 which is supported by bearings 178 attached to the side walls of the saw section 134 (FIG. 8). The shaft 176, as shown in FIG. 10, is connected at one end to a hydraulic motor 180 which, when activated, drives the shaft and the sprocket to move the chain and hence any bales in the inlet chute 132 into the saw section 134.

The driving power for all the moving elements of the machine 130 is an electric motor 182 which is mounted on one end of the upper horizontal member 142. An output shaft of the motor has a pulley 184 which is connected by a belt 186 to a pulley 188 that is fixed to one end of the upper saw shaft 154. To the opposite end of the upper shaft, as shown in FIG. 13, is fixed another pulley 190 which is connected by a belt 192 to a pulley 194 on one end of the lower saw shaft 158. Connected to the opposite end of the lower shaft 158 from the pulley 194 is a hydraulic pump 196. Thus, when the electric motor 182 is turned on, it operates to rotate both saw shafts 154 and 158 and also operates the hydraulic pump 196 to provide hydraulic pressure.

In the embodiment of FIGS. 8 to 13, an outlet chute 136 is provided which has a conveyor belt 198 for moving the cut hay to a location away from the saw section. As described previously, the conveyer belt is supported by a first pair of sprockets 200 mounted on a shaft 202 near one end of the outlet chute and a second pair of sprockets (not shown) mounted on shaft located its other end. The two sets of sprockets drive a pair of endless chains 203, which support the conveyor belt. One of the sprocket shafts, preferably located under the saw section, is connected to a hydraulic motor 204, as shown in FIG. 10, for driving the conveyor during operation of the machine.

As shown in FIG. 12, the outlet chute 136 the conveyor belt 198 which is preferably formed as a continuous series of flexible sections interconnected at intervals by transverse members 205 attached to the chains 203 which extend around their respective sprockets. The outlet chute is attached to the underside of the saw section so that it cantilevers upwardly at an angle (e.g. 30°), as shown in FIG. 8, thereby placing the outlet end of the chute well above ground level.

As best shown in FIG. 11, the side walls 138 and 140 of the saw section are provided with lower edges that are inclined upwardly at the desired angle. Each side wall inclined edge is provided with an outwardly extending flange 206 which is sized to match and engage a similar flange 208 on a side wall of the outlet chute 136. Spaced from the lower end of the outlet chute near the saw section are a pair of vertical supports 210 which are attached, as by welding or bolting to the side walls 209 of the outlet chute. The lower ends of these vertical supports may be provided with enlarged base members or rotatable wheels, if desired. When the flanges 208 of the outlet chute are drawn adjacent to the matching flanges 206 of the saw section they are held together by suitable fasteners 210 (e.g. bolts) to maintain the outlet chute 136 in its inclined position.

The drive shaft for the outlet conveyor is located under the lower saw blades 160 and thus well under the lower horizontal member of the saw section. This assures that all the cut hay falls only on the conveyor belt 198 and none can accumulate in the saw section.

The hydraulic pump 196 supplies the necessary hydraulic pressure to drive the hydraulic motors 180 and 204 for the input bale mover chain 168 and the output conveyor 198, respectively. In the diagram of the hydraulic drive system as shown in FIG. 10, the hydraulic pump 196 (driven by the lower saw shaft) draws hydraulic fluid from a storage tank 212 which is located at a suitable location, preferably on the underside of the saw section. Output flow from the pump is furnished via a conduit 214 to a flow control unit 216 which controls fluid pressure and flow and thence to a valve control unit 218. The latter provides forward, reverse or stop controls to the inlet conveyor motor 180 via conduit 220 which returns to the control unit 218. Another outlet 222 from the control unit is connected to a direct outlet 224 from the flow control and is furnished via conduit 226 to outlet conveyor motor 204. A return conduit 228 from the outlet conveyor motor 204 is furnished through a filter 230 back to the storage tank 212. Thus, in operation, the electric motor 182 serves to drive the two gangs of cutting saws 158 and 160 as well as the hydraulic pump 196 which in turn powers the hydraulic motors 180 and 204 for the input and output conveyors.

A somewhat modified machine 130A is shown in FIG. 14 which operates without an outlet conveyor. Here, the cut hay is dispensed from the saw section 134 and may be accumulated in a pile near the machine or dispersed upon the user's portable conveyor device (not shown). In the machine 130A, a bottom hood member 232 having a trapezoidal shape is connected by a hinge member 165 to a bottom horizontal member 234 of the saw section 134 and serves to collect dust and particles from the cut hay bales which fall through the lower horizontal member. The outlet opening 236 of the saw section has a rectangular shape and may be provided with a fabric shroud 238 to further control dust and particles that are dispensed. In this modification the drive system and an inlet conveyor mechanism 132 is provided as described for the machine 130, but no hydraulic motor for an outlet conveyor is required. The machine 130A may be supported above ground level by suitable legs 240 and 242 which are attached to its side walls at spaced apart locations.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A machine for cutting generally oblong, compressed bales of dried hay or forage for livestock, comprising:

means forming an inlet chute for receiving compressed bales in end-to-end alignment;

endless chain means for moving bales forwardly in a linear path within said chute;

a sawing section connected to said inlet means including side walls, a floor at the same level as said inlet chute for supporting a bale as it moves through the sawing section and a horizontal top member parallel with and spaced above said floor member, a lower horizontal shaft extending under said floor member and an upper shaft extending over said top member and parallel to said lower shaft, a plurality of circular saws fixed at spaced apart locations to said upper and lower shafts, each said circular saw on one said shaft being vertically aligned with a circular saw on the other shaft, pulley means at one end of said lower shaft and a hydraulic pump connected to the other end of said lower shaft, belt means for connecting one said pulley means on said upper shaft with said pulley means on said lower shaft, power means connected to said upper shaft for driving said circular saws on both said shafts and said hydraulic pump;

a hydraulic motor connected to said pump for driving said endless chain means in said inlet chute;

whereby activation of said power means serves to move hay bales along said inlet chute and also to rotate said circular saws for cutting said bales into smaller sections.

2. The machine as described in claim 1 wherein said power means is an electric motor mounted on said top member and belt means interconnecting said motor and a pulley means on said upper shaft.

3. The machine as described in claim 1 including an outlet conveyor for cut hay attached to said saw section including an inclined outlet chute, a movable belt within said outlet chute and a hydraulic motor for driving said belt and connected to said hydraulic pump.

4. The machine as described in claim 3 wherein said side walls of said saw section are provided with outwardly extending inclined flange members along their lower edges, and matching flange members at one end of said outlet conveyor, and means for securing said flange members together whereby said outlet conveyor extends upwardly from said saw section.

5. The machine as described in claim 1 including a movable upper cover means for said circular saws on said upper shaft pivotally connected to said horizontal top member, and a movable lower cover means for providing access to said circular saws on said lower shaft, said lower cover means being pivotally connected to said floor member of said sawing section.

* * * * *